United States Patent [19]
Jackson

[11] Patent Number: 6,145,752
[45] Date of Patent: Nov. 14, 2000

[54] TEMPERATURE MONITORING AND CONTROL SYSTEM

[76] Inventor: Ronald E. Jackson, 100 E. Thompson Rd., Indianapolis, Ind. 46227-1621

[21] Appl. No.: 09/185,857

[22] Filed: Nov. 4, 1998

[51] Int. Cl.[7] .......................... H01H 37/04; G05D 23/12
[52] U.S. Cl. .................. 236/78 R; 165/210; 236/99 D; 337/380
[58] Field of Search .............................. 236/78 R, 68 B, 236/99 D, 101 R; 62/158; 337/380, 333; 361/2; 165/255, 270

[56] References Cited

U.S. PATENT DOCUMENTS

| | | | |
|---|---|---|---|
| 1,478,084 | 12/1923 | Whittington | 337/380 |
| 2,649,530 | 8/1953 | Dietz | 236/68 B |
| 2,836,695 | 5/1958 | Johnson | 236/68 B |
| 3,993,120 | 11/1976 | Iberg et al. | 165/26 |
| 4,338,791 | 7/1982 | Stamp, Jr. et al. | 62/160 |
| 4,556,169 | 12/1985 | Zervos | 236/49 |
| 4,784,212 | 11/1988 | Brimer et al. | 165/2 |
| 5,002,226 | 3/1991 | Nelson | 236/78 R |
| 5,277,244 | 1/1994 | Mehta | 165/2 |

OTHER PUBLICATIONS http://media4.hypernet.com/~ELMWOOD/bimetal.htm.
ELMWOOD SENSORS—Bimetal Thermostats.

*Primary Examiner*—William Wayner
*Attorney, Agent, or Firm*—Locke Reynolds LLP

[57] ABSTRACT

This invention generally relates to a thermostat system for use in thermal regulation of an environment.

This invention involves thermal regulation systems for controlling the temperature of an environment and the thermostat systems used in thermal regulation systems. The invention provides a pair of contacts and a creep action bi-metal thermostat, electrically connected to the pair of contacts. The bi-metal thermostat provides an electrical connection between the pair of contacts when the thermostat is exposed to temperatures within one defined range, and the thermostat interrupts any electrical connection between the pair of contacts when the thermostat is exposed to temperatures that are outside of the defined range. A capacitor, is electrically connected between the contacts, in parallel with the creep action bi-metal thermostat to prevent heating caused by electrical arcing within the bi-metal thermostat from altering the performance of the bi-metal thermostat. A cover having an exterior surface confronting the medium being thermally regulated and an interior surface, enveloping the thermostat, creates a thermal drag between the temperatures experienced by the thermostat and the ambient temperature of the medium being thermally regulated.

17 Claims, 7 Drawing Sheets

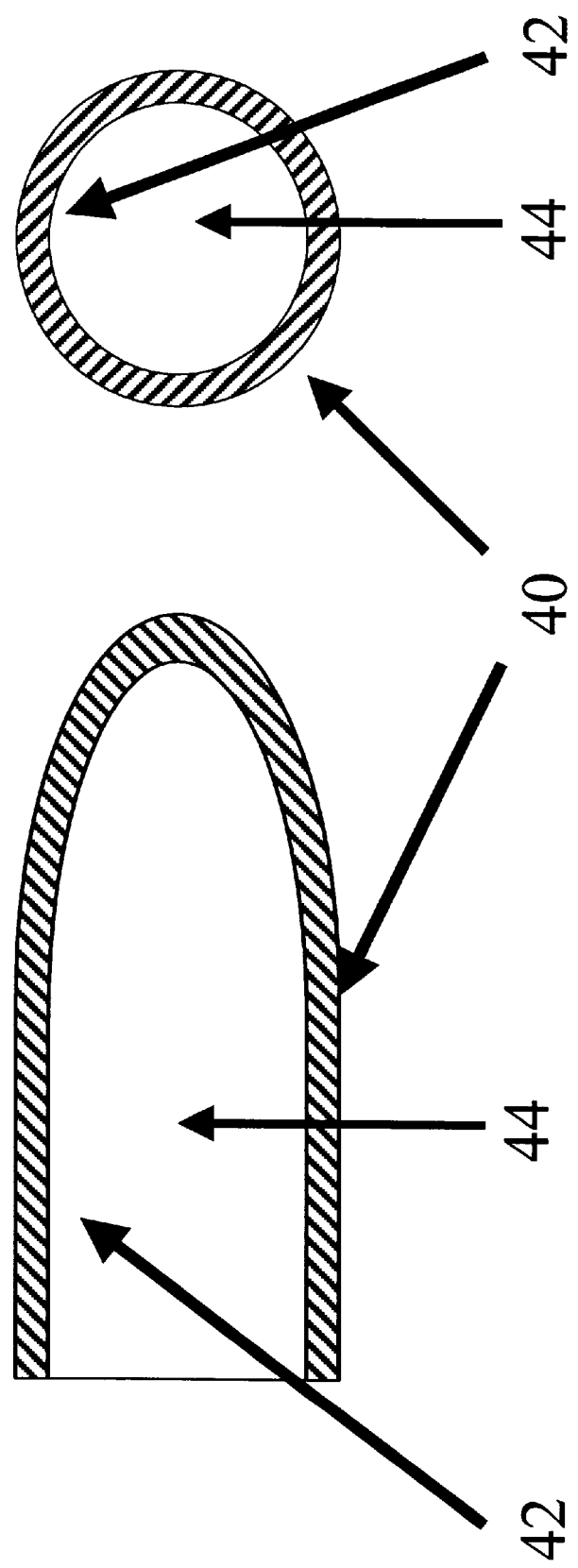

TEMPERATURE MONITORING AND CONTROL SYSTEM

BACKGROUND OF THE INVENTION

1. Field of the Invention

The invention involves thermal regulation systems for controlling the temperature of an environment, and the thermostat systems used in thermal regulation systems. The invention, in particular, solves long standing problems associated with the use of a compact creep action bi-metal thermostat as a feedback device for monitoring and controlling the thermal conditions in a regulated environment. The invention has particular utility when it is used to control the temperature of a temporary work environment such as a building construction site.

2. Description of the Prior Art

Thermal regulation systems involve two principal components, a thermal regulator for altering the temperature of an environment and a thermostat for determining the temperature of the environment and for actuating the thermal regulator as necessary to maintain the temperature of the environment. Typically a thermal switch is used to actuate the thermal regulators, and thus, to maintain the thermal conditions in the environment. The thermal switch opens or closes an electrical circuit when the temperature of an environment to which it is exposed passes from one range of temperatures and into another range of temperatures. In these systems, the thermal regulator is controlled by the condition of the electrical circuit.

One such thermal switch is the bi-metal thermostat. The bi-metal thermostat works by taking advantage of the principal that dissimilar metals have different coefficients of thermal expansion, and therefore they expand at different rates when exposed to temperature increases. When two dissimilar metals are bound together they form what is known as a bi-metal strip. When a bi-metal strip is exposed to heat, the bi-metal strip begins to expand and lengthen. However, one metal strip of the bi-metal expands faster than the other strip. This causes the bi-metal strip to bend as the temperature to which it is exposed increases. Bi-metal devices use this bending or "creep" action to move an electrical contact element into and out of engagement with another contact element when the bi-metal strip is exposed to an environment having a temperature within certain range. The contacts are connected, in series, with an electrical circuit. The electrical circuit activates or de-activates a thermal regulator, thus altering the temperature of the environment being controlled by the bi-metal thermostat.

The use of the creep action device to control a thermal regulator has not been favored in practice because the creep action of the bi-metal allows small changes in the temperature of the environment to cause separation or engagement of the contact elements. This results in excessive cycling of the thermal regulator. This excessive cycling enhances the wear on the thermal regulator, results in overregulated and unstable conditions in the environment, and causes user dissatisfaction with the thermal control system.

Excessive cycling of devices controlled by bi-metal thermostats is also caused by the fast response of the creep action bi-metal thermostat to changes in the temperature of the environment. This fast response leads to irregular performance as it causes the bi-metal thermostat to react to local or transient changes in the temperature of the environment. This may result in the unwarranted actuation of the thermal regulator and improper modulation of the temperature of the environment. This also may cause the thermal regulator to execute short cycle engagements increasing the wear and tear on the thermal regulator and reducing the life cycle of the components of the thermal regulator.

The limitations of the creep action bi-metal thermostat have led to the development of the snap action bi-metal thermostat. The snap action bi-metal thermostat also uses a bi-metal device to bring electrical contact elements into and out of contact with one another. However, it differs from the creep action bi-metal thermostat in that a magnet is inserted into the system to cause a change in the engagement cycle of the contact elements.

In one embodiment of the snap action thermostat, two metallic strips are used. One of these strips is a bi-metal strip and the other strip is a single metal strip. One end of each strip is fixed, and the strips are positioned in spaced relation to each other. An electrical contact element is fixed to the other end of the bi-metal strip and the bi-metal strip is permitted to bend in response to temperature changes. Another electrical contact element is fixed at the other end of the single metal strip. However, the other end of the single metal strip is positioned so that the creep of the bi-metal strip will move the contact element at the end of the bi-metal strip into engagement with the contact element of the single metal strip when the bi-metal thermostat is exposed to an environment having a temperature within a certain range.

These strips are then electrically connected, in series, to an electric circuit. Thus, when the environment to which the bi-metal strip is exposed remains within one range of temperatures, the contacts at the ends of the elongated strips do not contact each other and the electric circuit is left open. At other temperatures the contacts are engaged, and the electrical circuit is completed.

This action is consistent with the action of a standard creep action bi-metal thermostat. However, in a snap action thermostat, a magnet is positioned to urge the contact element on the bi-metal strip into engagement with the contact element on the single metal strip. Thus, when the contact element on the bi-metal strip approaches the contact element on the single metal strip, it reaches a certain position where magnet exerts sufficient force to pull or "snap" the contact elements into engagement. At this point, the circuit to which the thermostat is connected is completed causing an appropriate reaction from the thermal regulator.

When a snap action thermostat is used in conjunction with a cooling system, the snap action causes the contacts to engage at temperatures above the temperatures required to cause the contacts of the creep action bi-metal thermostat to engage. Further, the magnetic attraction will tend to hold the contacts in an engaged position at temperatures that would cause the contacts of a creep action bi-metal thermostat to separate. Thus, the snap action thermostat introduces a thermal differential or a range of temperatures within which the thermal conditions of the environment may deviate from the preferred temperature. By allowing the temperature of the regulated environment to vary within this range, short cycling of the thermal regulator is avoided.

The use of a relatively expensive bi-metal snap acting thermostat to detect temperature changes in an environment and to provide a signal change when the temperature of the environment passes above or below the differential is well known. Thermostats built upon snap action technology are generally of the adjustable type, and relatively expensive. They are also large in size and must typically be mounted on a wall of other structures. While non-adjustable, creep action, bi-metal thermostats are less expensive, more rugged and substantially smaller, the absence of a thermal differential has limited their use.

The problems associated with the absence of the thermal differential in a creep action bi-metal thermostat are particularly pronounced in circumstances where a creep action bi-metal thermostat is called upon to regulate the temperature of an environment that must be maintained with tight limits. In such circumstances, the contacts are maintained within close proximity to each other at all times arid, accordingly, small changes in the thermal conditions to which the bi-metal thermostat is exposed may actuate the thermal regulator. Under such circumstances, the creep action bi-metal thermostat is particularly vulnerable to local and transient temperature variations.

Accordingly, it is an object of this invention to provide a thermal regulation system and thermostat system using a creep action bi-metal thermostat design that does not execute short cycles caused by the absence of a thermal differential.

The creep action bi-metal thermostat has also been found to be subject to a second design limitation. In creep action bi-metal thermostats, the contact element on the bi-metal strip is brought into and out of engagement with the contact element on the single metal strip due to the thermal expansion of the bi-metal strips. At certain temperatures, these contact elements may be held in very close proximity to each other without actually making contact. Because the contact elements are electrically connected in series with an electrical circuit, a difference of potential exists between the contact elements. Under proper conditions, this difference in potential may cause arcing between the contact elements. When this occurs, heat is released. This heat affects the bi-metal strip causing an expansion of the strip which can result in untimely disengagement of the contact elements.

This arc heating problem can have serious consequences when the device is used as a feedback means in a closely regulated system. Because the internal temperature of the bi-metal thermostat is raised by exposure to the arc, the bi-metal thermostat may actually disengage a heating system only seconds after this heating system has been engaged. Conversely, arc heating may cause a cooling system to stay on longer than necessary. This results in improper performance of the bi-metal thermostat and irregular performance of thermal regulation systems that rely upon the bi-metal thermostat.

In certain applications the use of a shorter or more compact thermostat is an advantage. Such a compact or "short strip" creep action bi-metal thermostat is particularly vulnerable to the effects of arc heating because of the reduced mass of the bi-metal strip. Unfortunately, no solution exists in the art that will protect such "short strip" thermostats from irregular performance caused by arc heating.

Thus, it is a further object of this invention to provide a thermal regulation system and a thermostat system using a creep action bi-metal thermostat that is protected from short cycling caused by the absence of a thermal differential and also protected from short cycling caused by the heat generated by arcing between the contacts.

The need for this invention is particularly acute in conjunction with thermal regulation systems used at building construction sites. Typically, if workers at construction sites are provided with thermostats having adjustable settings, they will set these thermostats systems at maximum hot or maximum cool settings. This results in additional expense in unnecessary heating and cooling. However, the installation of more expensive complicated thermostats at building construction sites has not proven to be successful because of the expense and delay associated with the installation of such thermostats. Further, such systems are not compact in size and thus they are vulnerable to damage at construction sites. The obvious value of these devices also makes them an attractive target for vandals and thieves.

However, it is not clear that adjustable thermostats are necessary at building construction sites. Rather, experience teaches that the optimal working temperature of a construction environment is relatively constant, between 60 and 70 degrees Fahrenheit. Thus, in construction sites, the use of an adjustable thermostat is not absolutely necessary. Rather, single set point thermostats can be used. The use of a compact single set point or non-adjustable creep action bi-metal thermostat to monitor the work environment is particularly advantageous. Such a thermostat would reduce energy costs, yet be inexpensive. Further, such a thermostat is easily installed, difficult to damage, unlikely to be stolen, and easily removed.

Accordingly, it is a further object of this invention to provide a compact low cost single set point creep action bi-metal thermostat system for temporary use at construction sites, or in other thermal regulation systems where the cost of the components, particularly the thermostat, must be closely limited, and where the thermostat must, respond to temperature variations, within a tightly defined range.

SUMMARY OF THE INVENTION

The invention provides a pair of contacts and a creep action bi-metal thermostat, electrically connected to the pair of contacts. The bi-metal thermostat provides an electrical connection between the pair of contacts when the thermostat is exposed to temperatures within one defined range, and the thermostat interrupts any electrical connection between the pair of contacts when the thermostat is exposed to temperatures that are outside of the defined range. A capacitor, is electrically connected between the contacts, in parallel with the creep action bi-metal thermostat to prevent heating caused by electrical arcing within the bi-metal thermostat from altering the performance of the bi-metal thermostat. A cover having an exterior surface confronting the medium being thermally regulated and an interior surface, enveloping the thermostat, creates a thermal drag between the temperatures experienced by the thermostat and the ambient temperature of the medium being thermally regulated.

The foregoing objects and other objects as well as the characteristic features of this invention will become more fully apparent and more readily understandable by the following description and the appended claims when read in conjunction with the following drawings.

BRIEF DESCRIPTION OF THE DRAWINGS

FIG. 4 depicts a longitudinal cross-section of one embodiment of the cover.

FIG. 5 depicts a radial cross section of one embodiment of the cover.

DESCRIPTION OF THE PREFERRED EMBODIMENTS

Figure 1:
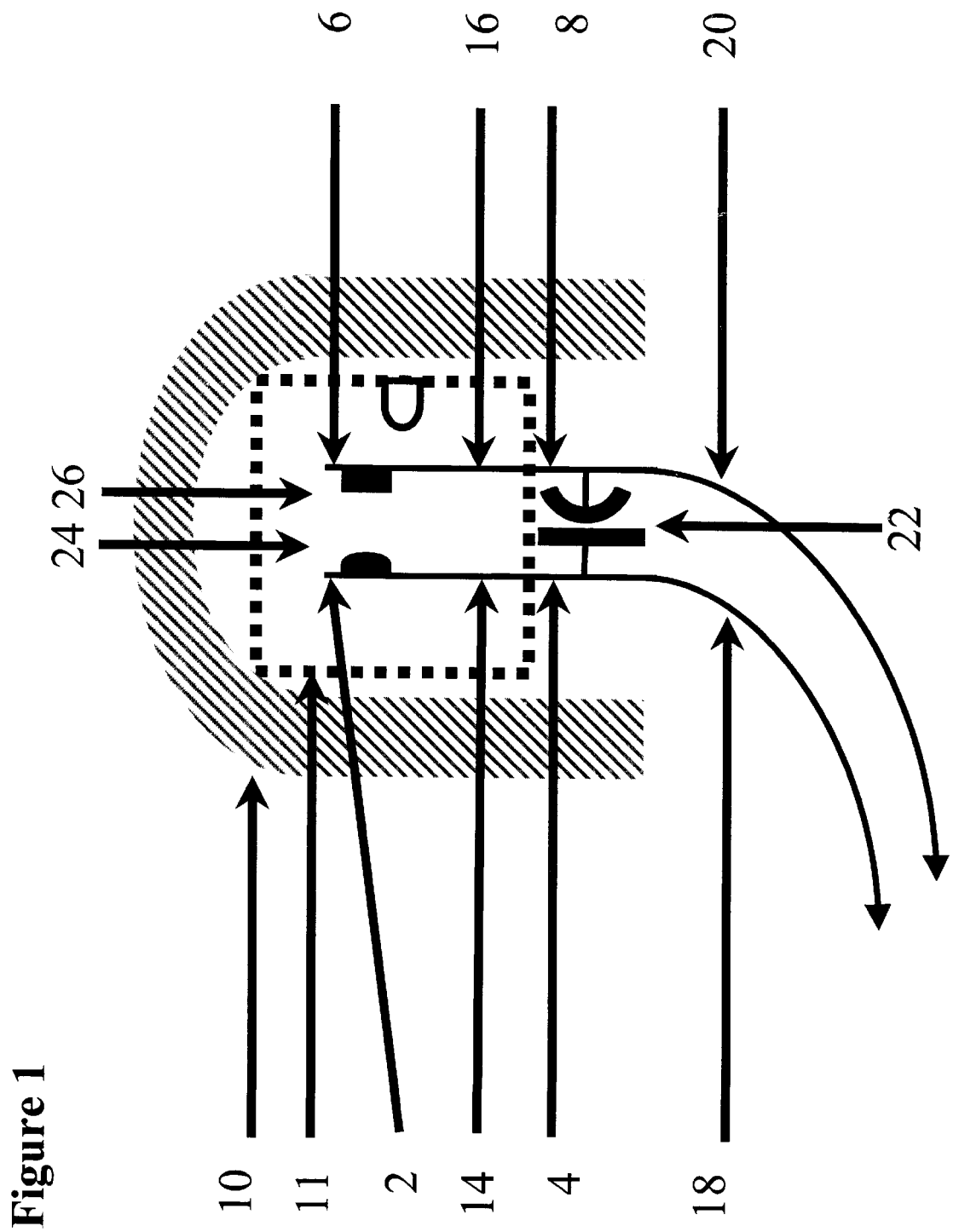
FIG. 1 depicts the thermostat system of the present invention.
Figure 2:
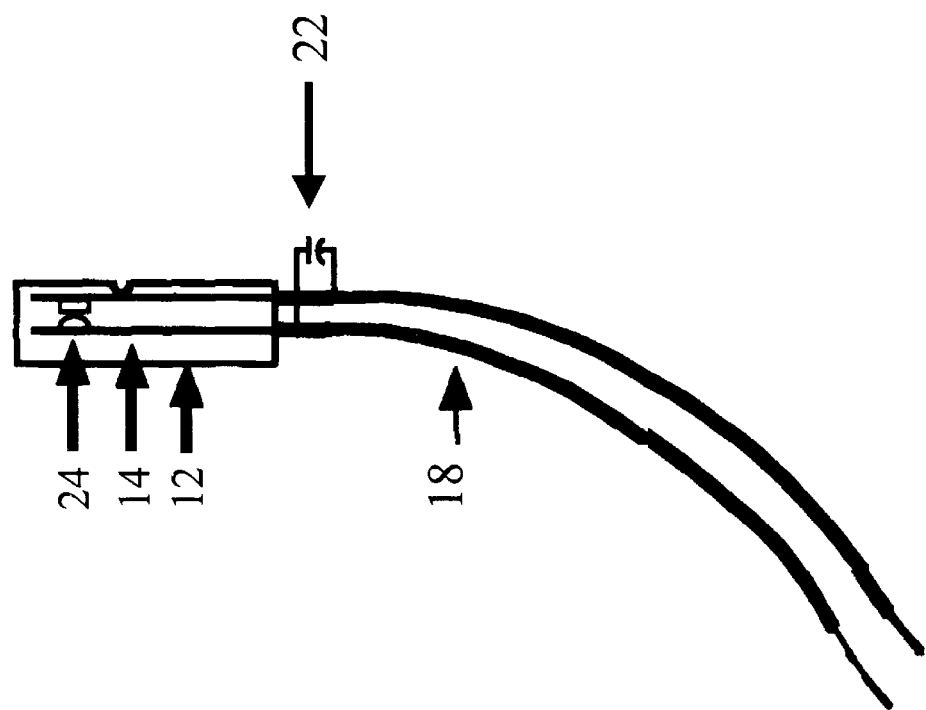
FIG. 2 depicts a bi-metal thermostat with a capacitor.

Referring now to FIG. 1, 2, 4 and 5, there is shown in one preferred embodiment of the present invention, a thermostat system 1 having a conventional creep action single set point bi-metal thermostat 12, comprised of bi-metal strip 14 and a single metal strip 16, and external cover 12, and conventional contacts 18 and 20. The bi-metal strip 14 has two ends, 2 and 4, and the single metal strip 16 has two ends, 6 and 8, and first ends 4 and 8 are held in spaced relation by the external cover 11. A contact element 24 is fixed to the second end 2 of the bi-metal strip. The second end 6 of the bi-metal strip 14 is also permitted to bend in response to temperature changes. Another contact element 26 is fixed at the second end 6 of the single metal strip 16. However, the second end 6 of the single metal strip 16 is positioned so that the creep of the bi-metal strip 14 will move the contact element 24 at the second end 2 of the bi-metal strip 14 into engagement with contact element 26 attached to the single metal strip 16 when the bi-metal thermostat 12 is exposed to an environment having a defined temperature.

In conventional practice, electrical contact 18 is electrically connected bi-metal strips 14 and electrical contact 20 is electrically connected to the single metal strip 16. Contact elements 24 is electrically connected to the bi-metal strip 14 and contact element 26 is electrically connected to the single metal strip 16. Accordingly, when contact elements 24 and 26 engage each other, an electrical circuit is completed between contacts 18 and 20.

The bi-metal thermostat 12 is contained within an external cover 11, that has a defined three dimensional geometric form to secure the bi-metal strip 14 and single metal strip 16 in spaced relation to each other, to prevent contaminants from interfering with the creep action of the bi-metal strip 14 and to permit the contacts 18 and 20 to make electrical connection with the bi-metal strip 14 and the single metal strip 16 respectively.

In this invention, a cover 10 envelops the bi-metal thermostat. This cover is composed of a material having a thermal conductivity of 10 W/m° C. or less and has an exterior surface 40 confronting the environment being thermally regulated and an interior surface 42 affixed to the bi-metal thermostat 12. This cover 10 creates a thermal drag between the temperatures experienced by the bi-metal thermostat 12 and the ambient temperature of the environment being thermally regulated.

A capacitor 22 having a capacitance of at least 0.1 micro Farads is also incorporated in this invention. This capacitor is electrically connected, in parallel, across the contacts 18 and 20, and thus it is also electrically connected in parallel with the bi-metal strips 14 and the single metal strip 16.

As the bi-metal thermostat 12 is exposed to increasing temperatures, the bi-metal strips 14 and 16 expand. At a defined temperature the expansion of the bi-metal strips forces contact elements 24 and 26 into contact with one another completing an electric circuit between the contacts 18 and 20. The bi-metal thermostat 12 thus produces an output between the contacts 18 and 20 that is indicative of the temperature of the environment to which the bi-metal thermostat 12 is exposed.

Figure 3:
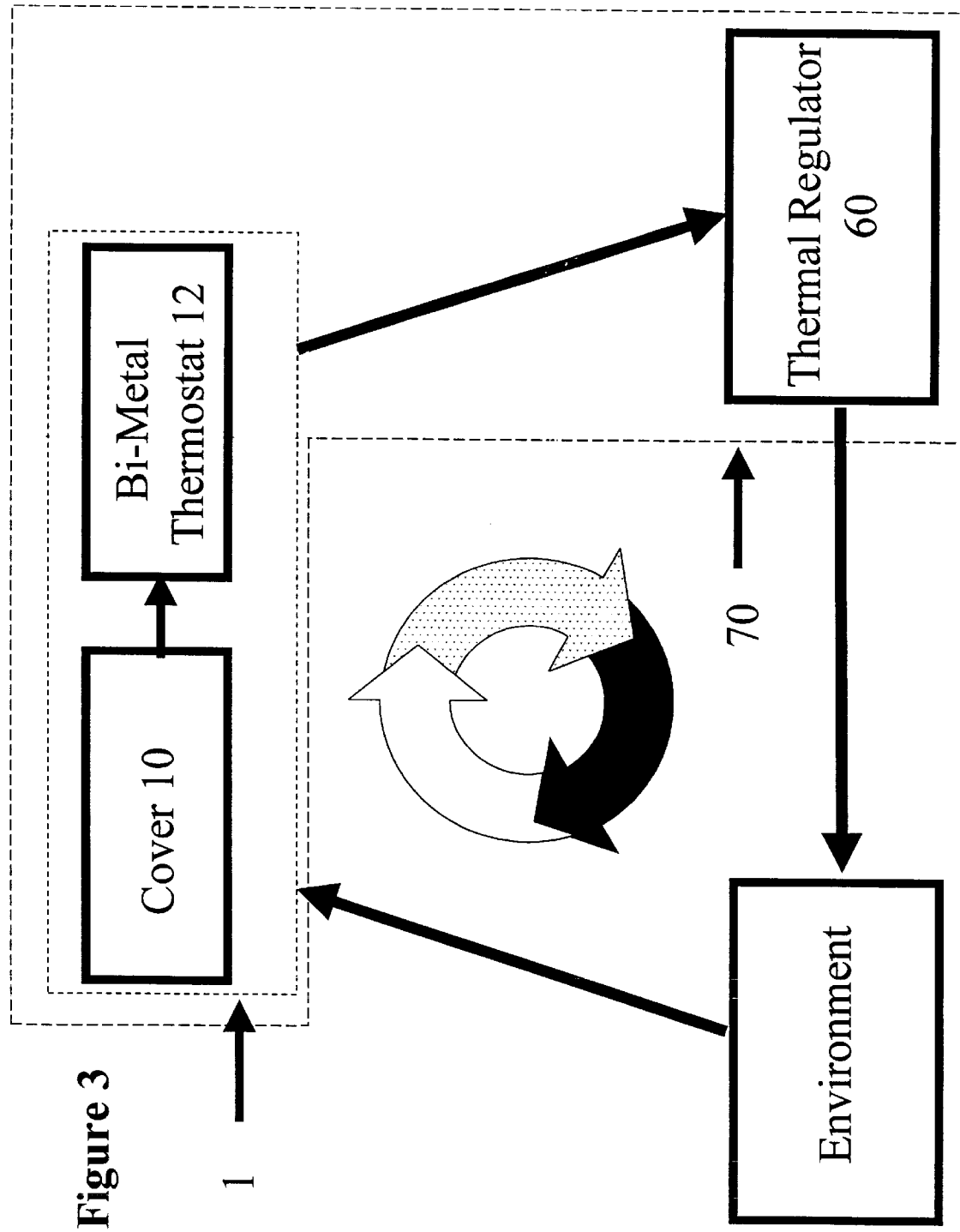
FIG. 3 depicts the thermal regulation system of the present invention.

As depicted in FIG. 3, this thermostat system is an integral component in a thermal regulation system 70. The cover 10 is exposed to the environment being monitored and changes temperature in response to the temperature of the environment. As the bi-metal thermostat 14 changes temperature in response to the exposure to the cover 10, the electrical circuit between contacts 18 and 20 transitions from a state where an open circuit exists between the electrical contacts 18 and 20 and a state where a closed circuit exists between the electrical contacts 18 and 20. This circuit actuates the thermal regulator 60. When actuated, the thermal regulator 60 alters the temperature of the environment which, in turn, alters temperature of the cover 10.

Importantly, under the present invention, changes in the temperature of the environment are not presented directly to the bi-metal thermostat 12. Instead, changes in temperature of the environment are first encountered by the exterior surface 40 of the cover 10. When the temperature of the environment differs from the temperature of the cover 10, the cover 10 will either radiate thermal energy into or absorb thermal energy from the environment. This changes the temperature of the cover 10. Because the cover 10 envelops the bi-metal thermostat 12, changes in the temperature of the cover 10 are passed to the bi-metal thermostat 12.

As noted above, changes in the temperature of the bi-metal thermostat 12 result may result in a change in the condition of the state of the electrical connection between contacts 18 and 20 and actuation of the thermal regulator 34.

The addition of the cover 10, therefore, introduces a thermal drag between the temperature of the regulated environment and the temperature of the bi-metal thermostat 12. Because the temperature of the cover 10 must be altered before the temperature of the thermostat 12 will be altered the cover 10 acts both as a buffer and as a thermal filter. Because of this, brief and transient temperature variations in the environment caused by stray air currents and other events will not lead directly a change in state of the electrical circuit between contacts 18 and 20, as they would in the prior art. Rather, the temperature of the cover 10 will change only when a specific amount of energy has been absorbed or released by the cover 10. The time that it takes for the cover 10 to release or absorb enough energy to alter its temperature is a function of the thermal conductivity of the material from which the cover 10 is made and the thickness, shape and size of the cover 10.

Accordingly, careful selection of the thermal conductivity of the material used to make the cover 10 can be used to calibrate a desired buffering and filtering effect. With the thermal input to the bi-metal thermostat 12 so filtered, the fast reaction time of the bi-metal thermostat 12 is used to good advantage to change the state of the electrical circuit between the contacts 18 and 20 immediately upon a change in the temperature of the cover and the problems associated with the use of the bi-metal thermostat in the prior art are avoided.

In practice it has been found that a material with a thermal conductivity of 10 W/m° C. or less is preferable when used in conjunction with a cover having a thickness of greater than about 0.1 mm. As can be reasonably anticipated, the objects of this invention can be accomplished using a cover having various combinations of thermal conductivity and material thickness.

This invention also overcomes the problems associated with the heat caused by arcing between the contact elements 24 and 26. This is accomplished by the electrical connection of a capacitor 22 across the contacts 18 and 20.

This places the capacitor 22 in parallel with the contact elements 24 and 26 and allows the capacitor 22 to absorb potential energy that could create an arc. If it were not for the capacitor 22, the energy from the arcing would produce heat that would be detected by the bi-metal strips 14 and 16 and cause the bi-metal thermostat to short cycle the thermal regulator 38.

While the use of capacitor 22 to prevent arcing is known in the prior art, the use of capacitors 22 to prevent the effects of heat caused by arcing from altering the operation of a compact or short strip bi-metal thermostat 12 is not known. In practice it has been found that heating caused by arcing can be prevented by the use of a capacitor 22 having a capacitance of greater than about 0.1 micro Farads.

A preferred embodiment of the thermostat system is shown in FIG. 1. FIG. 1 depicts a generally rectangular single set point short strip bi-metal thermostat 12 enveloped by a cover 10 composed of a plastic material. In this embodiment, the cover is formed from a material having a thermal conductivity of 10 W/m C or less. The cover 10 has two surfaces, an exterior surface 40 confronting the environment being thermally regulated and an interior surface 42 of said cover forming an interior, generally cylindrical, cavity 44 enveloping the capacitor 22 and the bi-metal thermostat 12. In this preferred embodiment, the cover 10 has a thickness between the exterior surface 40 and the interior surface 42 greater than about 0.5 mm.

Figure 6:
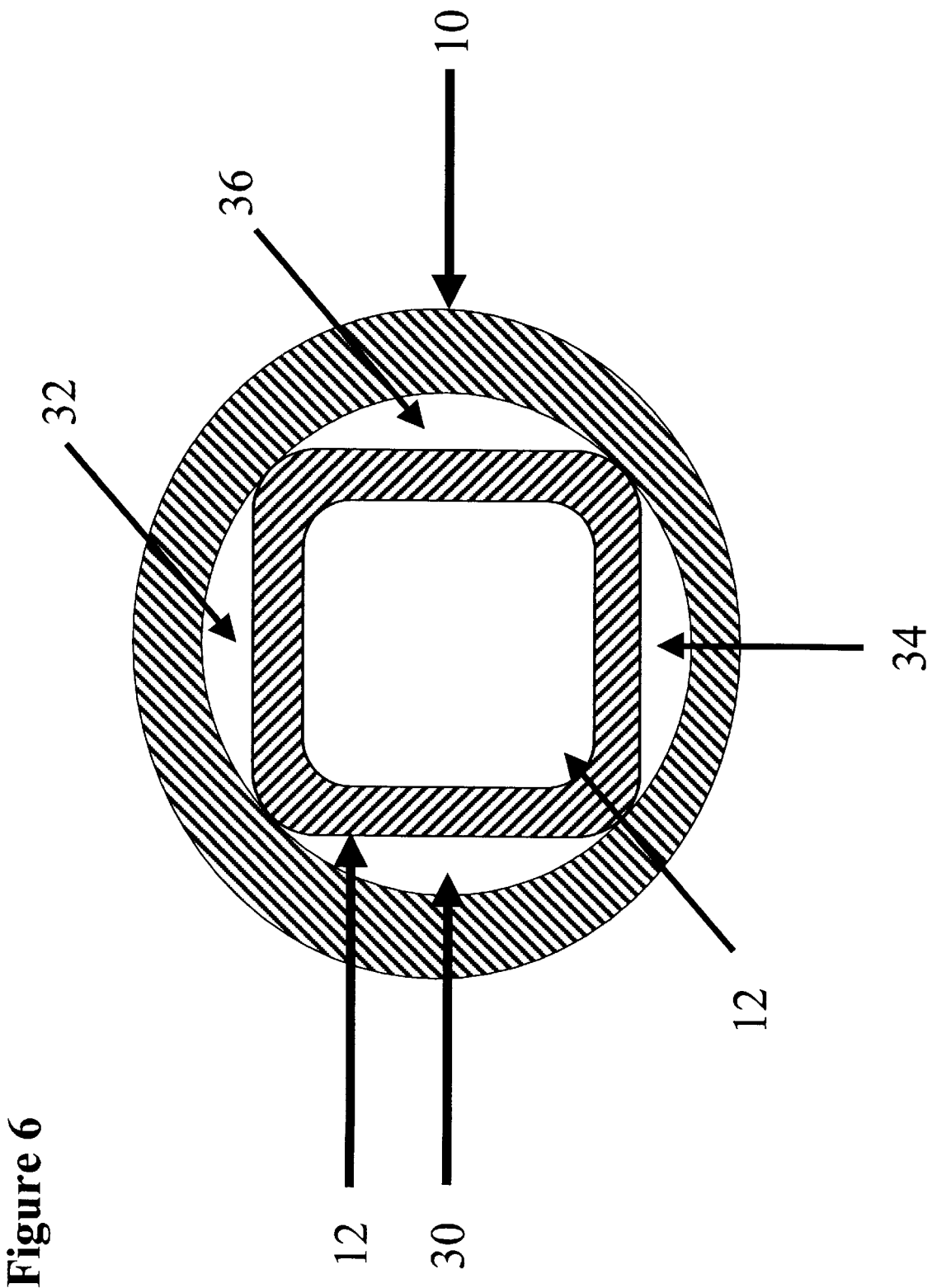
FIG. 6 depicts a radial cross section of one embodiment of the cover and bi-metal thermostat external cover combined.
Figure 8:
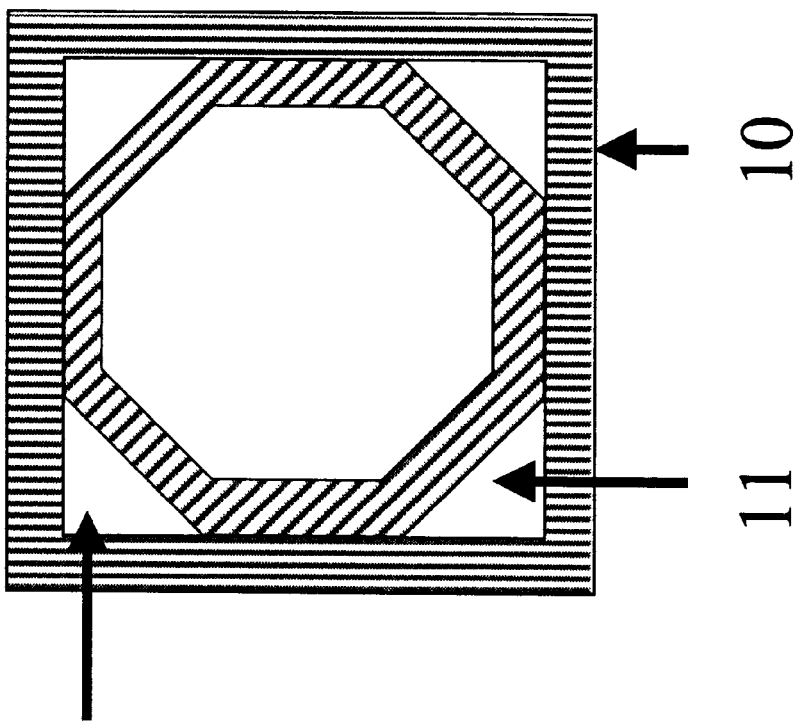
FIG. 8 depicts cross-sectional views of another embodiment of the thermal cover and the external cover of the bi-metal thermostat.
Figure 7:
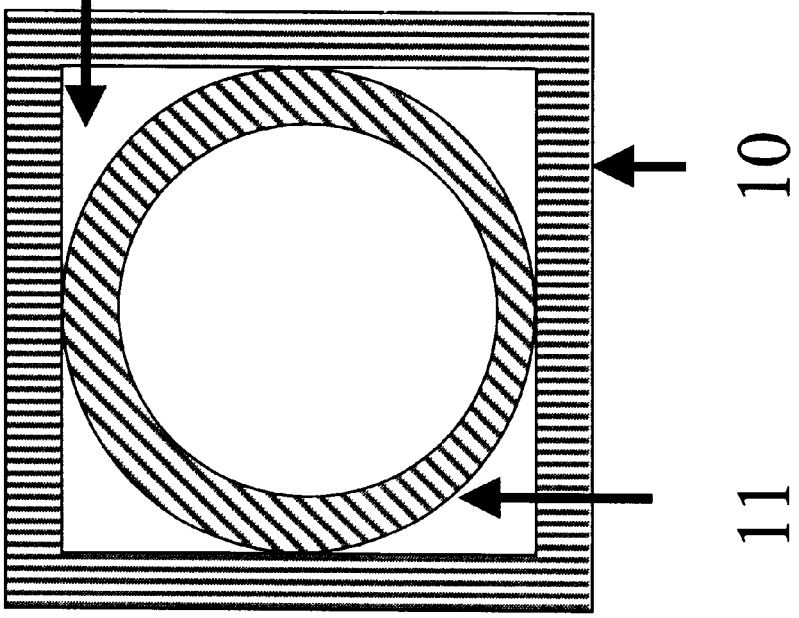
FIG. 7 depicts cross-sectional views of another embodiment of the thermal cover and the external cover of the bi-metal thermostat.

As is shown in FIGS. 4–6, the cross section of the bi-metal thermostat 12 is generally rectangular, yet the interior surface 40 of the cover 10 is cylindrical. Accordingly while the cover 10 envelops the bi-metal thermostat 12, spaces 30, 32, 34, 36 are left between the interior surface 40 of the cover 10 and the exterior cover 11 of the thermostat 12. This allows a thermal media 38 to enter into the spaces 30, 32, 34, 36. This creates a further thermal drag with associated buffer and filtering effects between the temperatures experienced by the bi-metal thermostat 12 and the ambient temperature of the environment being thermally regulated. From FIGS. 7 and 8, it is apparent that these spaces can be created by covers and bi-metal thermostats having any number of geometric configurations.

Figure 9:
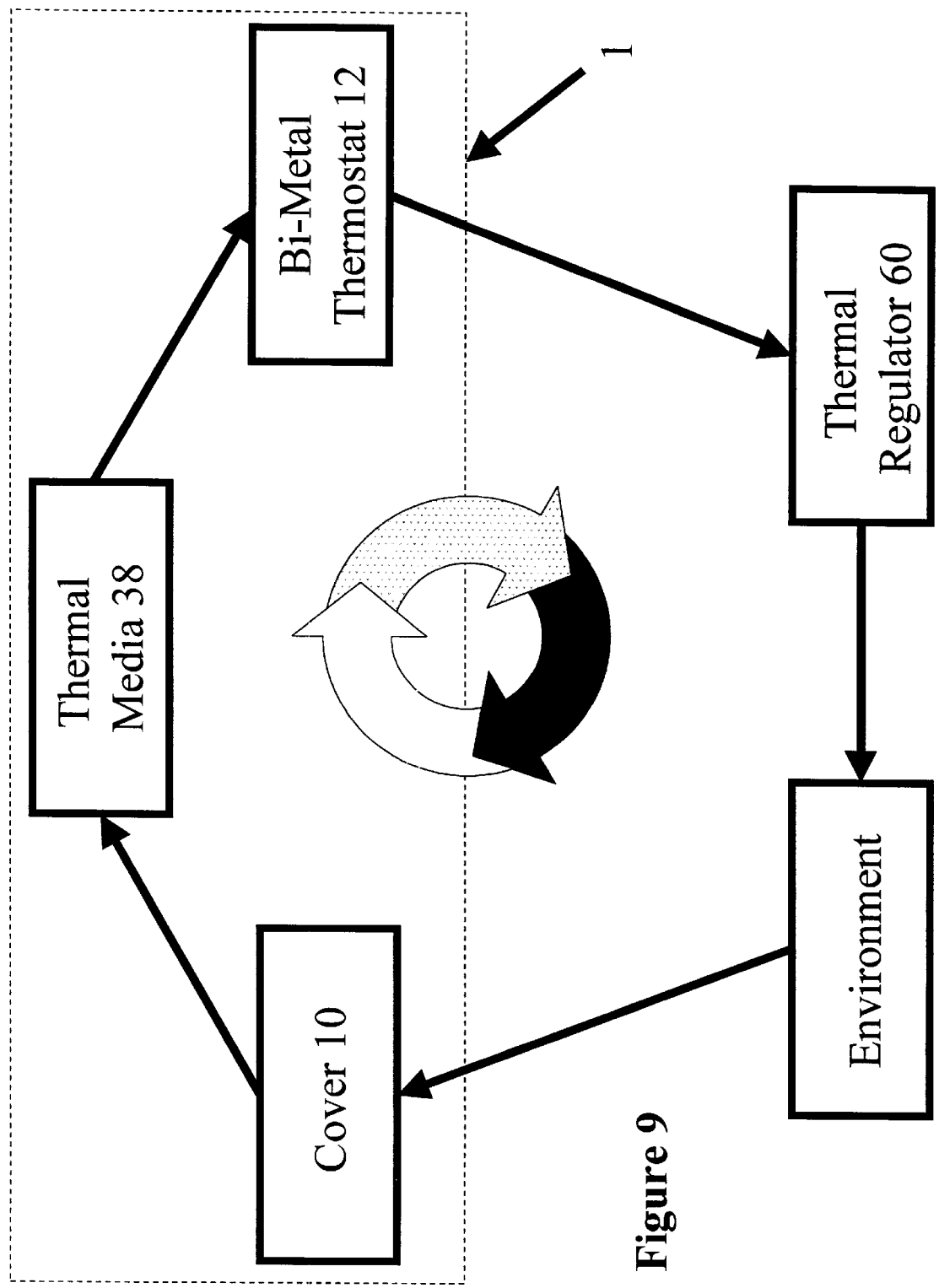
FIG. 9 depicts a second embodiment of the invention wherein a second thermal medium is employed to introduce a further thermal drag between the environment and the bi-metal thermostat.

As depicted in FIG. 9, another preferred embodiment, only the cover 10 is exposed to the environment. This cover 10 changes temperature over time in response to changes in the temperature of the environment. Changes in the temperature of the cover 10 are transmitted to a thermal media 38 contained in the spaces 30, 32, 34, and 36 created between the bi-metal thermostat 12 and the cover 10. As the temperature of the thermal media 38 in the spaces 30, 32, 34, 36 changes, the temperature of the bi-metal thermostat 12 will change. Thus, thermal conditions in the environment will pass through a two stage filtering and buffering process before they begin to alter the conditions at the bi-metal thermostat 12.

This thermostat system is therefore capable of monitoring the temperature of an environment within a tight range of temperatures yet it is inexpensive to manufacture and compact in size. This thermostat system is easily integrated into temporary thermal control systems such as those at construction sites and can provide both temperature sensing and control functions in a thermal regulation system.

Accordingly, the present invention provides a temperature monitoring and control system and thermostat system that meets the objectives of the invention and resolves several long standing problems associated with the use of short strip bi-metal thermostats.

What is claimed is:

1. A thermostat system for producing a delayed output upon exposure to a temperature change that crosses a thermal limit between defined temperature ranges, the thermostat system comprising:

a pair of contacts;

a creep action bi-metal thermostat, electrically connected to the pair of contacts, the thermostat providing an electrical connection between the pair of contacts when the thermostat is exposed to temperatures within a defined range, the thermostat interrupting any electrical connection between the pair of contacts when the thermostat is exposed to temperatures that are outside of the defined range, and an enclosure having a defined three dimensional shape enclosing the thermostat and providing electrical connections between the thermostat and the contacts;

a capacitor, electrically connected between the contacts, in parallel with the creep action bi-metal thermostat to prevent heating of the bi-metal caused by arcing when the bi-metal thermostat alters the state of the electrical connection between the contacts; and a cover composed of a material having a thermal conductivity of 10 W/m° C. or less and having an interior surface and an exterior surface confronting the environment being thermally regulated, the cover enveloping the thermostat, to create a thermal drag between the temperatures experienced by the thermostat and the ambient temperature of the environment being thermally regulated, the interior surface of the thermal cover forming a three dimensional surface separated from contiguous contact with the enclosure of the thermostat by spaces between the interior surface of the thermal cover and the enclosure of the thermostat to establish a thermal medium between the thermal cover and the enclosure to control the thermal drag between the temperatures experienced by the thermostat and the ambient temperature of the environment being thermally regulated.

2. A thermostat system, as claimed in claim 1, wherein said enclosure is in the form of an elongated hollow block with the elongated portion of the enclosure having a generally squared cross section, the enclosure containing said bi-metal thermostat.

3. A thermostat system, as claimed in claim 2, wherein said cover comprises two ends, one end closed and one end open into an interior channel, with the channel and the open end having a generally circular cross section and said cover enveloping the length of the elongated bi-metal thermostat enclosure within the interior channel.

4. A cover as claimed in any one of claims 1, 2 or 3, said cover being composed of a thermoplastic resin having a thickness of greater than about 0.5 mm.

5. A thermostat system as claimed in claim 1, wherein the thermal medium between the cover and the thermostat enclosure is air.

6. A thermostat system as claimed in any one of claims 1, 2, 5, wherein said capacitor has a capacitance of greater than about 0.1 micro Farads.

7. A thermostat system for temporary use in conjunction with an environmental control system to regulate the temperature of the environment within a structure, the thermostat system producing a defined output when the system is exposed to an external media having a temperature within a defined range, the thermostat system comprising:

a pair of contacts for temporary connection to an environmental control system;

a creep action bi-metal thermostat, having a single, non-adjustable set point, electrically connected to the pair of contacts, the thermostat providing an electrical connection between the pair of contacts when the thermostat is exposed to temperatures within one defined range, and the thermostat interrupting any electrical connection between the pair of contacts when the thermostat is exposed to temperatures that are outside of the defined range, the thermostat being contained within an enclosure forming an elongated hollow block;

a capacitor electrically connected between the contacts, in parallel with the creep action bi-metal thermostat to inhibit heating of the bi-metal strips caused by arcing when the bi-metal thermostat alters the state of the electrical connection between the contacts; and a cover formed having an exterior surface confronting the environment being thermally regulated, the cover enveloping the enclosure, to create a thermal drag between the temperatures experienced by the thermostat and the ambient temperature on the environment being thermally regulated.

8. A temporary thermostat system, as claimed in claim 7 wherein said capacitor has a capacitance of greater than about 0.1 micro Farads.

9. A temporary thermostat system, as claimed in claim 8 wherein said interior surface of said cover forms a cylindrical cavity receiving the elongated exterior covering of the thermostat, and said interior surface further defines spaces between the interior surface and the exterior surface of the thermostat to allow atmospheric gasses to enter into the spaces creating a further thermal drag between the temperatures experienced by the thermostat and the ambient temperature of the environment being thermally regulated.

10. A temporary thermostat system, as claimed in claim 8 wherein the interior surface of the thermal cover further envelops the capacitor.

11. A low cost system for regulating the temperature of an environment, the system compromising:

a pair of contacts;

a creep action bi-metal thermostat, the thermostat providing an electrical connection between the pair of contacts when the thermostat is exposed to temperatures within a defined range, the thermostat interrupting any electrical connection between the pair of contacts when the thermostat is exposed to temperatures that are outside of the defined range;

a capacitor, electrically connected between the contacts, in parallel with the creep action bi-metal thermostat to prevent heating of the bi-metal strips caused by arcing when the bi-metal thermostat alters the state of the electrical connection between the contacts;

a cover composed of a material having a thermal conductivity of 10 W/m° C. or less and having an interior surface and an exterior surface confronting the environment being thermally regulated, the cover enveloping the thermostat, to create a thermal drag between the temperatures experienced by the thermostat and the ambient temperature of the environment being thermally regulated;

a thermal regulator for altering the temperature of the environment, and the thermal regulator is electrically connected to the pair of electrical contacts and activating or deactivating based upon the existence or nonexistence of an electrical circuit between the contacts for detecting the presence of and absence of an electrical connection between the pair of contacts, and activating to alter the temperature of the environment when the appropriate conditions exist at the contacts.

12. A thermostat system, as claimed claim 11, wherein said bi-metal thermostat further comprises an enclosure having a defined three dimensional shape for containing the thermostat and for permitting electrical connections between said thermostat and said contacts.

13. A thermostat system, as claimed in claim 12, wherein said interior surface of said thermal cover forms a three dimensional surface separated from contiguous contact with said enclosure of said thermostat by spaces between the interior surface of the thermal cover and the exterior cover of said thermostat to establish a thermal medium between said thermal cover and said thermostat to control the thermal drag between the temperatures experienced by the thermostat and the ambient temperature of the environment being thermally regulated.

14. A thermostat system as claimed in claim 13, wherein the thermal medium between the cover and the thermostat enclosure is air.

15. A thermostat system as claimed in any one of claims 11–13, wherein said capacitor has a capacitance of greater than about 0.1 micro Farads.

16. A cover as claimed in any one of claims 11–13, wherein said cover is composed of a thermoplastic resin having a thickness of greater than about 0.1 mm.

17. A fixed point, single temperature, thermostat for use in combination with an environmental control system, said thermostat comprising:

a pair of contacts for temporary connection to an environmental control system;

a creep action bi-metal thermostat, having a single, non-adjustable set point electrically connected to the pair of contacts, the thermostat providing an electrical connection between the pair of contacts when the thermostat is exposed to temperatures within one defined range, and the thermostat interrupting any electrical connection between the pair of contacts when the thermostat is exposed to temperatures that are outside of the defined range, the thermostat being contained within an enclosure forming an elongated hollow block;

a capacitor electrically connected between the contacts, in parallel with the creep action bi-metal thermostat to inhibit heating of the bi-metal strips caused by arcing when the bi-metal thermostat alters the state of the electrical connection between the contacts; and a cover formed from a material having a thermal conductivity of 10 W/m° C. or less and having an exterior surface confronting the environment being thermally regulated, the cover enveloping the enclosure, and an interior surface of said cover forming an interior cavity enveloping the capacitor and the elongated exterior covering of the thermostat, and said interior surface further defining spaces between the interior surface and the exterior surface of the thermostat to allow atmospheric gasses to enter into the spaces creating a further thermal drag between the temperatures experienced by the thermostat and the ambient temperature of the environment being thermally regulated.

* * * * *